US010693578B1

(12) United States Patent
Shapiro et al.

(10) Patent No.: US 10,693,578 B1
(45) Date of Patent: Jun. 23, 2020

(54) PREDICTIVE RADIO TUNING SYSTEMS AND METHODS FOR AIRCRAFT

(71) Applicant: Rockwell Collins, Inc., Cedar Rapids, IA (US)

(72) Inventors: Geoffrey Shapiro, Cedar Rapids, IA (US); Colin D. Reed, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 15/667,411

(22) Filed: Aug. 2, 2017

(51) Int. Cl.
*H04H 40/27* (2008.01)
*H04H 20/55* (2008.01)
*H04B 1/40* (2015.01)
*G08G 5/00* (2006.01)
*H04B 7/185* (2006.01)
*H04H 20/57* (2008.01)
*B64D 43/00* (2006.01)

(52) U.S. Cl.
CPC ............. *H04H 40/27* (2013.01); *B64D 43/00* (2013.01); *G08G 5/0013* (2013.01); *H04H 20/55* (2013.01); *H04H 20/57* (2013.01)

(58) Field of Classification Search
CPC ........ H04H 40/27; H04H 20/55; H04H 20/57; B64D 43/00; G08G 5/0013; G08G 5/0021; G08G 5/0052; G08G 5/0065; G08G 5/025; G08G 5/00; G08G 5/02; H04B 7/18506; H04B 1/40; H04B 7/185
See application file for complete search history.

(56) References Cited

U.S. PATENT DOCUMENTS

| | | | |
|---|---|---|---|
| 6,727,851 B2 * | 4/2004 | Bass | G01S 5/12 342/418 |
| 8,909,392 B1 * | 12/2014 | Carrico | H04W 4/029 701/3 |
| 9,716,543 B2 * | 7/2017 | Gouillou | H04B 7/18506 |
| 9,754,494 B2 * | 9/2017 | Irfan | G08G 5/0026 |
| 2015/0364046 A1 * | 12/2015 | Lissajoux | G08G 5/0047 701/3 |
| 2017/0295582 A1 * | 10/2017 | Gurney | H04W 72/085 |
| 2018/0061243 A1 * | 3/2018 | Shloosh | G08G 5/0013 |

FOREIGN PATENT DOCUMENTS

| | | | | |
|---|---|---|---|---|
| WO | WO-2014115139 A1 * | 7/2014 | | G08G 5/0013 |
| WO | WO-2016122780 A1 * | 8/2016 | | G08G 5/006 |
| WO | WO-2017120618 A1 * | 7/2017 | | G01C 23/00 |

* cited by examiner

*Primary Examiner* — Pablo N Tran
(74) *Attorney, Agent, or Firm* — Donna P. Suchy

(57) ABSTRACT

Systems and methods provide providing predictive radio tuning for an aircraft. The systems and methods electronically receive data from an off aircraft source and integrate with aircraft sourced data. The information is related to frequencies for aircraft radios at one or more locations. The systems and methods electronically determine a location of the aircraft, electronically provide a predicted frequency in response to the location and the information using a radio tuning application, and display the predicted frequency on a radio tuning panel on an electronic display.

7 Claims, 3 Drawing Sheets

PREDICTIVE RADIO TUNING SYSTEMS AND METHODS FOR AIRCRAFT

BACKGROUND

Embodiments of inventive concepts disclosed herein relate generally to the field of communication systems. More particularly, embodiments of the inventive concepts disclosed herein relate to systems and methods that tune communication equipment or select communication channels.

Aircraft pilots rely on communications systems, such as, radio units, to report and request information, to receive instructions, to obtain navigation and weather information and to receive traffic information from the ground (e.g., air traffic control and beacons) and other aircraft. Pilots and co-pilots spend a significant amount of time tuning radios to appropriate channels or frequencies during preflight, flight and post flight activities. Setting radio frequencies for the radios is one of the most repeated tasks performed by the flight crew while flying. Pilots often follow the following procedure when changing radio frequencies:
1) Identify that a radio frequency change is required either by pilot initialization (e.g., need to taxi) or by air traffic control (ATC) (e.g., direction is given by the controller).
2) Find the frequency (e.g., when self-initiated, by opening a chart and finding the frequency of interest or when initiated by ATC, by hearing a frequency from a controller).
3) Open the radio tuning application.
4) Select the radio to tune.
5) Enter frequency into the standby field (XXX.XXX).
6) Swap frequencies.

Legacy radios generally use a tuning control panel that includes physical knobs, buttons or other selectors that give tactile feedback as the pilot or co-pilot makes frequency selections. The trend within avionics design is to use graphical user interfaces, such as user interfaces emulated keypads rather than physical knobs and buttons. Emulated keypads are considered less usable and can require increased selection time when compared to physical knobs or buttons due to lack of tactical feedback and precise finger positioning.

SUMMARY

In one aspect, the inventive concepts disclosed herein are directed to a method of providing a predictive radio tuning for an aircraft. The method includes electronically receiving data from an off aircraft source. The information is related to frequencies for aircraft radios at one or more locations. The method also includes electronically determining a location of the aircraft, electronically providing a predicted frequency in response to the location and the information using a radio tuning application, and displaying the predicted frequency on a radio tuning panel on an electronic display.

In a further aspect, the inventive concepts disclosed herein are directed to a predictive radio tuning system for an aircraft. The predictive radio tuning system includes a processor configured to receive flight information and radio frequency information and provide a list of predicted frequencies in response to the flight information and radio frequency information. The list of predicted frequencies is displayed on a virtual radio tuning panel for selection by the pilot.

In a further aspect, the inventive concepts disclosed herein are directed a communication system for an aircraft. The communication system includes a user interface, a display, a communication interface for receiving radio frequency data from a source, and a computer. The computer is configured to provide a frequency for the communication system using the radio frequency data from the source and flight plan information, and the frequency is provided to the display for selection via the user interface. The communication system is tuned to the frequency after selection.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Referring generally to the figures, systems and methods for selecting a frequency for a radio or communication system are described with respect to various aspects of inventive concepts. The systems and methods advantageously provide a radio tuning panel as an emulated or virtual panel on an electronic display and reduce the workload associated with selecting radio channels or frequencies in some embodiments. An adaptive tuning application is utilized to predict frequencies based upon parameters including but not limited to time of day, geographic location, flight plan, phase of flight, departure direction, area of the airport, sector congestion, active sectors, boundary crossings, arrival direction, flight parameters, and prior selections and offer the predicted frequencies for easier selection in some embodiments. In some embodiments, the frequencies are for communication with weather sources, towers, and navigation sources, other aircraft, or ATC in some embodiments.

In some embodiments, at least one predicted frequency is offered on a virtual radio tuning page user interface. The virtual radio tuning page user interface provides the at least one predicted frequency in text form based upon flight path and location information combined with most recently available data feeds from the federal aviation administration (FAA) in some embodiments. Pilots directly tune the radio by pressing one button or using one selector rather than using a conventional procedure which requires look-up and manual keypad entry of a number in some embodiments. The systems and methods advantageously allow the selection of a frequency shown in a predicted tuning frequency section of the radio tuning page user interface, thereby saving significant time which is especially valuable in high workload phases of flight in some embodiments.

It should be noted that the term aircraft, as utilized herein, may include any manned or unmanned object or vehicle capable of flight. Examples of aircraft may include, but are not limited to, fixed-wing aerial vehicles (e.g., propeller-powered or jet-powered), rotary-wing aerial vehicles (e.g., helicopters), manned aircraft, unmanned aircraft (e.g., unmanned aerial vehicles, or UAVs), ground stations, and delivery drones. The term radio, as utilized herein, refers to any type of wireless communication system.

Figure 1:
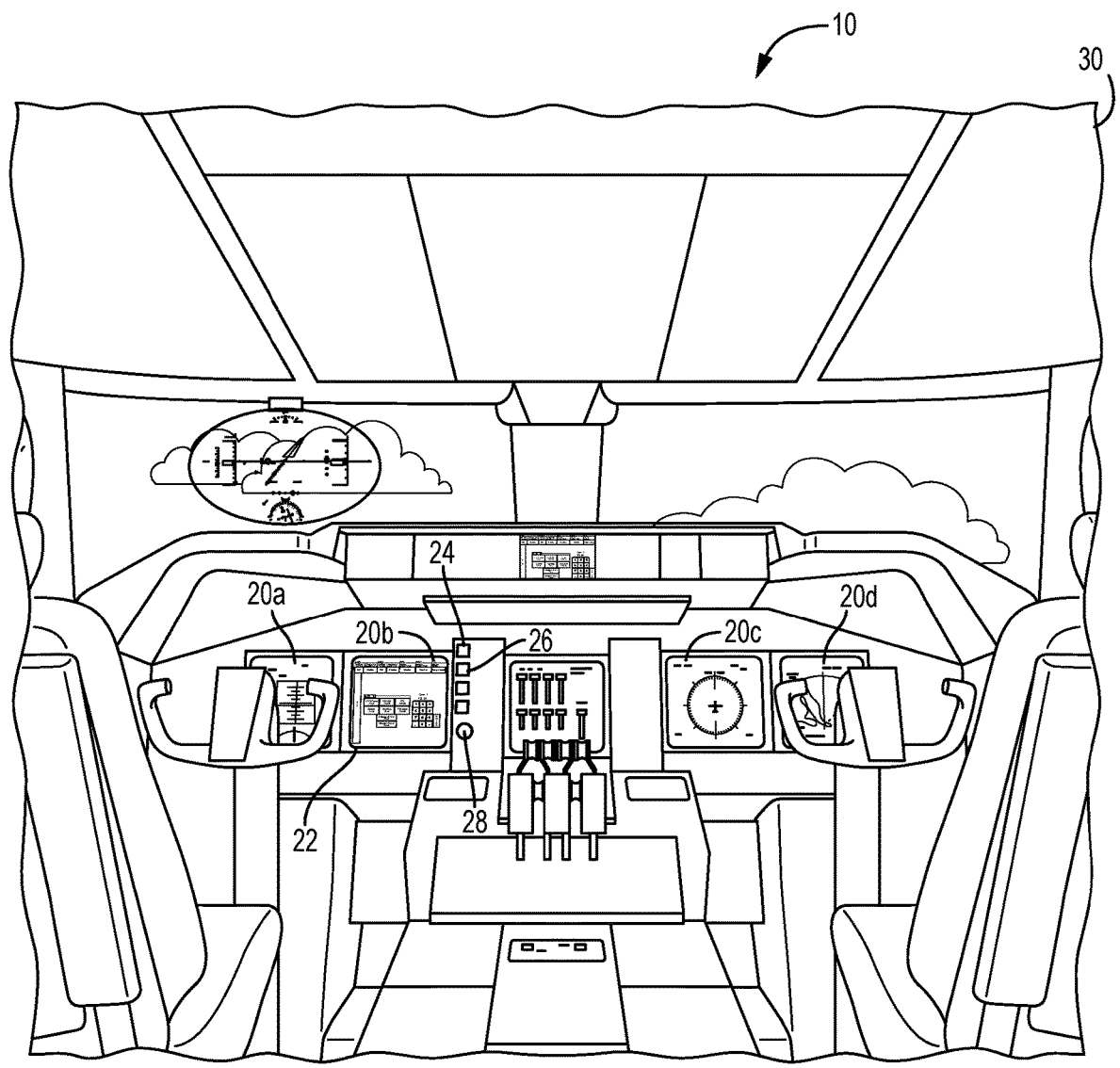
FIG. 1 is a schematic illustration of an aircraft control center or cockpit for an aircraft including a display providing a radio tuning panel according to exemplary aspects of the inventive concepts disclosed herein.

Referring to FIG. 1, an aircraft control center 10 or cockpit for an aircraft 30 is shown, according to some embodiments. The aircraft control center 10 includes flight displays 20a-d embodied as head down displays (HDDs). The flight displays 20a-d are used to provide information to the flight crew of the aircraft 30, thereby increasing visual range and enhancing decision-making abilities. In some embodiments, the flight displays 20 include a radio panel display, a weather display, a joint display, a weather radar map, a terrain display, an SVS image or an EFVS image.

According to some embodiments, at least one of the flight displays 20a-d (e.g., the flight display 20b) is configured to provide a radio tuning page or panel 22 as an image. The radios and/or communication systems of the aircraft 30 are tuned to a particular frequency selected using a user interface 24. The user interface 24 includes buttons 26 and a selector knob 28. In some embodiments, the user interface 24 is a touch screen provided on one or more of the displays 20a-d. Although the selector knob 28 and the buttons 26 are shown in FIG. 1, the user interface 24 can include or be a number of different types of data entry interfaces including but not limited to joy sticks, curser controllers, track balls, pointers, mouse devices, electronic styluses, keypads (virtual or physical), and speech recognition systems.

In some embodiments, the radio tuning panel 22 provides predicted frequencies or channels that may be required by the pilot on the display 22b in such a fashion as to make the tuning operation less complex. The pilot selects a predicted frequency by touching a touch screen associated with the flight display 20b or by manipulating the user interface 24 rather than manually entering a frequency found in a chart or verbally provided by ATC using a keypad in some embodiments. Reducing pilot workload while radio tuning justifies the removal of a manual keyboard panel within the flight deck or aircraft control center 10 for the radio tuning panel 22 configured as a virtual panel in some embodiments. In some embodiments, the use of a virtual panel can reduce the number of manual control panels, yielding significant size, weight, power and cost savings due to redundancy associated with multifunction displays such as the display 20b and yet improves dispatch availability.

Figure 2:
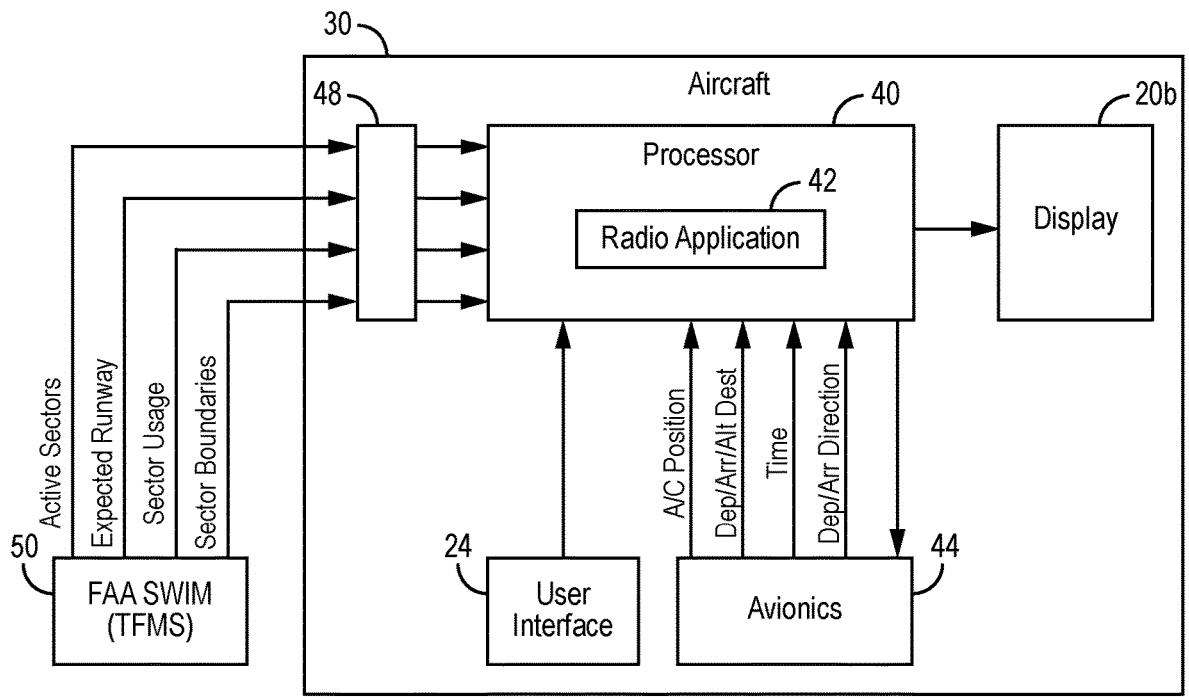
FIG. 2 is a schematic general block diagram of the aircraft associated with the aircraft control center illustrated in FIG. 1 including an onboard predictive radio tuning application according to exemplary aspects of the inventive concepts disclosed herein.

With reference to FIG. 2, the aircraft 30 includes the flight display 20b, the user interface 24, and a processor 40 with a radio application 42, avionics 44 and a communication interface 48. The processor 40 with the radio application 42 is disposed onboard the aircraft 30.

The processor 40 is in communication with an FAA system wide information management (SWIM) system 50. The FAA SWIM system 50 is an internet-based dissemination system for FAA sourced information such as flight data, weather information, airport operational status, and traffic data. The information provided by the FAA SWIM system 50 includes data streams that can be combined to infer which active radio frequencies are likely to be used in specific sectors. The information is active radio frequency information that is provided via communication interface 48 to the FAA SWIM system 50 via the internet in some embodiments. In some embodiments, the communication interface 48 communicates through a data management service such as a Rockwell Collins data management service.

The communication interface 48 is any system for electronic communications to and from the aircraft 30. In some embodiments, the communication interface 48 provides a communication link via satellite radio units, high frequency radio units, or other devices. In some embodiments, the communication interface 48 uses the internet service system of the aircraft to communicate via the Internet to the FAA SWIM system 50 (e.g., the GoGo network or direct TV satellite network).

The active radio frequency information can include information related to radio frequencies at particular locations. For example, the active radio frequency information can include radio frequencies for specific tasks at specific airports, for in-flight use in certain regions or sectors, the boundaries for those regions or sectors, the times at which the frequencies are used, frequencies for particular areas of the airport, sector congestion information, active sector information, frequencies for an arrival direction at an airport, and frequencies for a destination direction at an airport. In some embodiments, the FAA SWIM system 50 provides airport data, active sector data, expected runway data, sector usage data and sector boundary data and radio frequencies associated with each of those airports, sectors, runways, and sectors associated with the flight plan.

The data provided by the FAA SWIM system 50 changes dynamically as traffic flow for a particular day changes. For example, as sectors become active and boundary crossings change the frequencies associated with those locations change. In some embodiments, the information from the FAA SWIM system 50 is pulled or downloaded before the aircraft 30 leaves the gate or enters flight and is stored for the flight. In other embodiments, the information from the FAA SWIM system 50 is continually updated during flight via the communication interface 48 or on a ground-based server.

The processor 40 executing the radio application 42 can use the information from the FAA SWIM system 50 to determine likely frequencies that will be used while the aircraft 30 is on the ground or in flight and display those likely frequencies on the display 20b for selection on the radio tuning panel 22 (FIG. 1) via the user interface 24. In some embodiments, the radio application 42 sorts the data provided by the FAA SWIM system 50 or requests specific data in accordance with the flight plan. In some embodiments, the data can be obtained or requested from an intermediate server or service provider.

The avionics 44 refers to one or more avionic systems or subsystems for providing data related to the flight or flight plan to the processor 40 and radio application 42. The avionics 44 includes one or more radio units that are tuned via the radio application 42. The avionics 44 can include a position/navigation system, such as an onboard Embedded Global Positioning System/Inertial Navigation System (EGI), an inertial reference system (IRS), or other positioning device. In some embodiments, the avionics 44 include an air data system (e.g., an air data computer or flight management computer (FMC)) that can collect, derive, and accumulate data regarding flight plan, phase of flight, wind, air speed, turbulence, vertical speed, altitude, attitude, heading, velocity, acceleration, and/or other air-related data. The air data system is coupled with or in communication with the position/navigation system and aircraft sensors such as an altimeter (e.g., a radar altimeter and barometric altimeter), landing gear sensors, airspeed sensors, heading sensors, wheel sensors, etc.

The processor 40 can include one or more wireless or wired communication interfaces configured to enable communication with other devices/platforms including the avionics 44. The avionics 44 provides information such as time, departure/arrival direction, departure/arrival location, as well as alternate destination location, and position information (e.g., heading, latitude, longitude, and altitude) to the processor 40. In some embodiments, the processor 40 and the radio application 42 are part of the avionics 44.

In some embodiments, the radio application 42 selects a single frequency to list and updates the single frequency automatically over time as the aircraft 30 travels into different areas associated with different frequencies. If the processor 40 and the radio application 42 are unable to resolve ambiguities, a number of predicted frequencies can be listed. In some embodiments, the ambiguities are resolved using previous selections when under the same conditions. In some embodiments, a predicted frequency button is provided with the text label "multiple" thereby indicating that a user selection of the predicted frequency button will result in a list of likely frequencies from which the user can select the correct frequency. In some embodiments, the listed frequencies are provided on a number of virtual buttons upon which the user can select the correct frequency. In some embodiments, the list is prioritized based upon previously used frequencies in that area or under the same conditions (e.g., area, direction of arrival, phase of flight). The processor 40 is configured to collect data regarding radio frequencies and data related to the flight plan, aircraft position and prior selections to determine one or more predicted radio frequencies.

In some embodiments, the radio application 42 combines what is known about the flight path of the aircraft 30 via data from the avionics 44 along with recently available data feeds from the FAA SWIM system 50 to predict the frequencies required by the pilots. The radio application 42 provides the predicted frequencies to the radio tuning panel 22 such that pilots can directly tune a radio with just one button press rather than a complicated sequence of steps in some embodiments. The radio application 42 can utilize a time of day, departure direction, area of the airport, sector congestion, active sectors, boundary crossing and the arrival direction to determine a predicted frequency. The radio application 42 can advantageously find correct frequencies when multiple frequencies are available based upon more complex criteria. In some embodiments, a pilot may speak "tune weather" and the radio application 42, depending on phase of flight, tunes to the local airport (if on ground or near origin or destination) or if enroute, tunes to the nearest weather station. This facilitates entry of radio frequencies by not asking the pilot to specify the location or frequency. In some embodiments, the pilot may speak "tune Chicago tower", and the correct tower frequency is tuned.

In some embodiments, the processor 40 is configured to generate display data in a format that can be interpreted by the display 20b to generate display screens, such as the radio tuning panel 22. The list of predicted frequencies can be provided as part of image data provided to the display 20b. The radio tuning panel 22 can be provided on head down displays (HDDs), head up displays (HUDs), worn displays, helmet mounted displays, and any associated computers and display electronics.

The processor 40 is be any type of general purpose or special purpose processor (e.g., FPGA, CPLD, ASIC) or computer. The processor 40 also includes at least one memory, which may be any type of non-transitory computer or machine-readable storage medium (e.g., ROM, RAM, hard disk, flash memory). The memory includes one or more modules or routines including instructions that may be executed by the processor 40 for implementing the radio application 42 for the aircraft 30.

Figure 3:
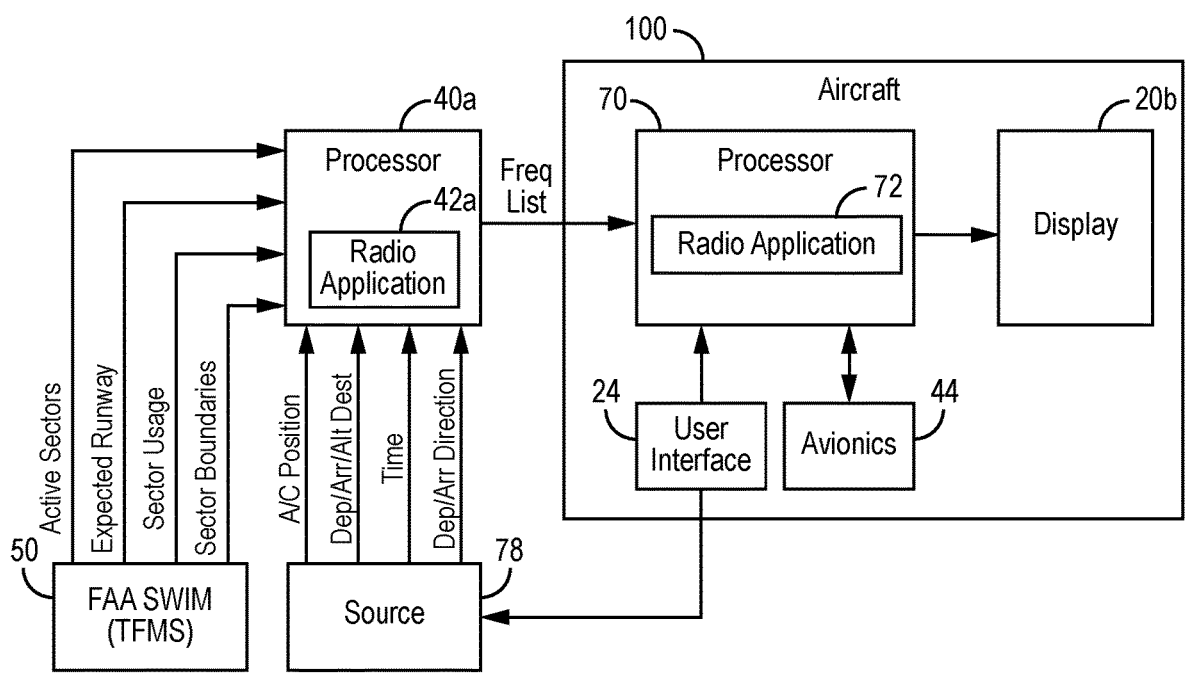
FIG. 3 is a schematic general block diagram of the aircraft associated with the aircraft control center illustrated in FIG. 1 in communication with a ground-based predictive radio tuning application according to exemplary aspects of the inventive concepts disclosed herein.

With reference to FIG. 3, the aircraft 30 utilizes an off-board or ground-based processor 40a with a radio application 42a, similar to processor 40 and radio application 42 (FIG. 2), for providing a frequency list. The processor 40a communicates with FAA SWIM system 50 and with the avionics 44 via a source 78. The source 78 can be in communication with the aircraft 30 via the internet using the communication interface 48 (FIG. 2). Alternatively, the processor 40a can receive avionic information from other sources or the FAA SWIM system 50. In some embodiments, the source 78 provides information such as departure and arrival direction, time, departure and arrival place and alternate destination place as well as aircraft position. In some embodiments, the source 78 can be part of FAA SWIM system 50, can be onboard the aircraft 30, or be a flight management server. The processor 40a provides the frequency list to a processor 70 that executes a radio application 72. The frequency list is utilized by the processor 70 and radio application 72 to provide the radio tuning panel 22 (FIG. 1) on the flight display 20b.

The use of processor 40a and radio application 42a allows the computations associated with predicted frequencies to be performed off of the aircraft 30. In some embodiments, the processor 40a is able to receive dynamically changing data from the FAA SWIM system 50 more easily than the processor 40 (FIG. 2), especially when large amounts of data are changing. The processor 40a with the application 42a and the processor 70 and radio application 72 can cooperate to perform the operations of the processor 40 with the radio application 42 (FIG. 2).

Figure 4:
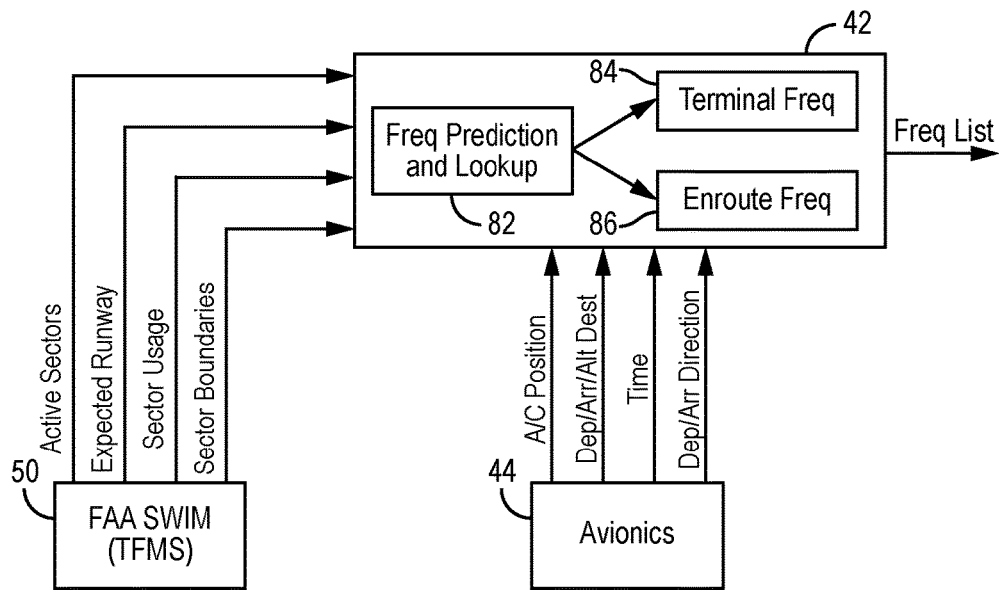
FIG. 4 is a more detailed schematic general block diagram of the onboard predictive radio tuning applications illustrated in FIG. 2 according to exemplary aspects of the inventive concepts disclosed herein.

With reference to FIG. 4, the radio application 42 includes a frequency prediction and lookup table 82, a terminal frequency module 84, and an enroute frequency module 86. The frequency prediction and lookup table 82 receives information from the FAA SWIM system 50 including sector boundaries, sector usage, expected runway frequencies and active sectors and stores frequencies associated therewith. The terminal frequency module 84 provides indications of frequencies for use while the aircraft 30 is at the terminal and the enroute frequency module 86 provides frequencies for use while the aircraft 30 is enroute. The frequencies are selected from the frequency prediction and lookup table 82 based upon various criteria, including but not limited to: time of day, geographic location, flight plan, phase of flight, departure direction, area of airport, sector congestion, active sectors, boundary crossings, arrival direction, flight parameters, and prior selections. The list of frequencies can be provided to a processor that provides the image data for the radio tuning panel 22.

In some embodiments, the terminal frequency module 84 selects airport frequencies based upon an airport identification (via a location determination and flight plan) and a time in some embodiments. The airport frequencies can include a tower frequency, a ground frequency for ground operations, an automatic terminal information service (ATIS) frequency, an approach and departure frequency, and a universal communication (Unicom) frequency for the airport. The approach/destination frequency can be chosen based upon phase of flight and flight plan information (e.g., approach or destination direction) in some embodiments. In some embodiments, prior frequency selections for that airport and areas and runways of the airport can be selected for display. In some embodiments, the ATIS terminal frequencies are selected in response to the expected runway that will be used. In some embodiments, the frequencies for the alternate airport on the flight plan are listed when flight parameters (the flight plan, the flight direction, and/or location) indicate that the alternate airport is the new destination.

In some embodiments, the enroute frequency module 86 selects enroute frequencies based upon an airport identification (via a location determination and flight plan) and a time in some embodiments. The enroute frequencies can include an air traffic control center (ARTCC) frequency and a class C airspace frequency. The enroute frequency can be chosen based upon phase of flight and sector locations. The enroute frequencies are automatically updated as sector boundaries are crossed in some embodiments. For example, a new frequency is provided as a sector boundary is crossed based upon comparing the aircraft position to the sector boundaries stored in the frequency prediction and lookup table 82 and the previous sector frequency is no longer listed or is listed as a lower priority frequency. In some embodiments, a change in a sector boundary can cause the predicted frequency to change because the aircraft is now in a different sector.

The terminal frequency module 84 and the enroute frequency module 86 utilize a rule set to choose the appropriate predicted frequency or frequencies. In some embodiments, the radio application 42 utilizes machine learning based upon historical flight paths and used radio frequencies. In some embodiments, a phase of flight changes the airport that is selected for frequencies. For example, after takeoff and entry into cruise, frequencies for the departure airport may no longer be displayed and frequencies for the arrival airport are displayed.

Figure 5:
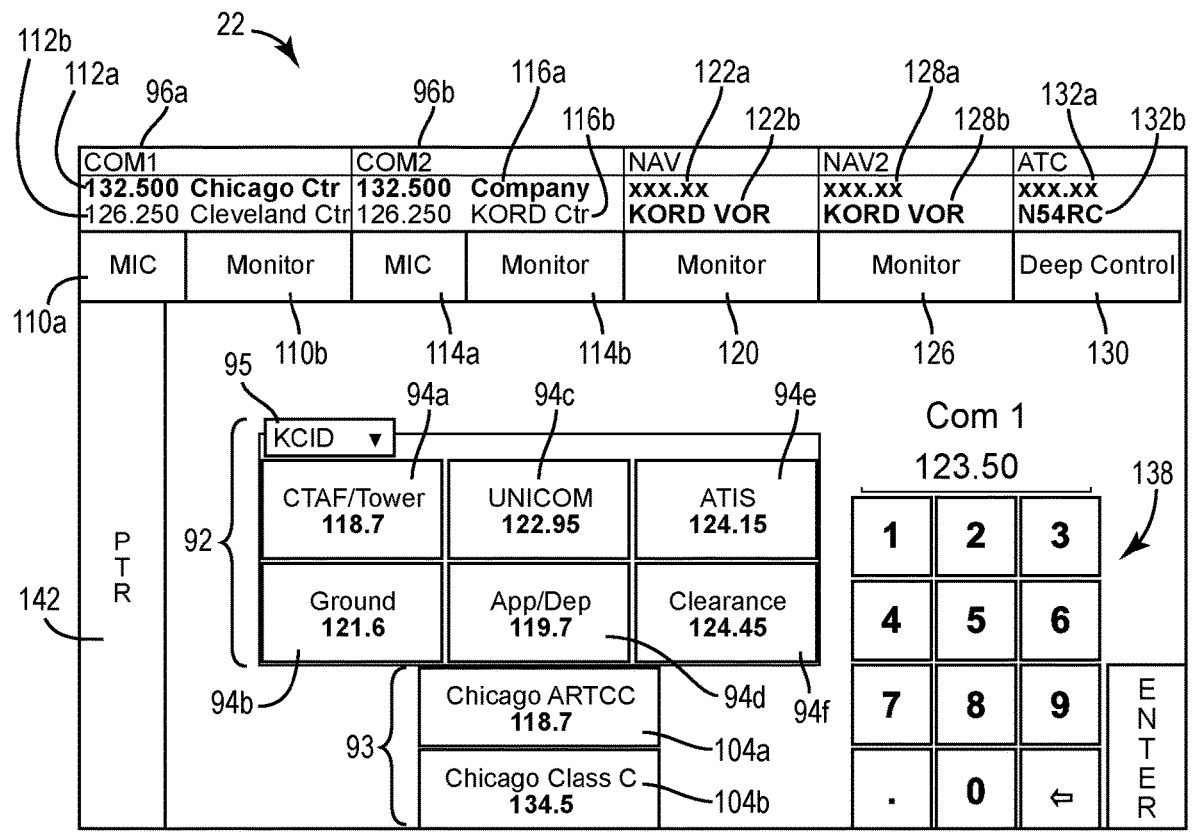
FIG. 5 is a more detailed illustration of the radio tuning panel for aircraft control center illustrated in FIG. 1 according to exemplary aspects of the inventive concepts disclosed herein.

With reference to FIG. 5, the radio tuning panel 22 includes a set 92 of virtual airport selections for airport frequencies and a set 93 of virtual enroute selections. The sets 92 and 93 include textual indications of predictive tuning frequencies for various tasks or locations in some embodiments.

An airport is selected via a menu item 95 in some embodiments. In some embodiments, the relevant airports based upon the flight plan are listed by selecting the menu item 95 (e.g., the departure airport (Cedar Rapids)). The airports are provided by the radio application 42. The menu item 95 indicates the airport corresponding to the set 92 in some embodiments. By changing the airport on the menu item 95, frequencies for the particular airport can be automatically queued up in the set 92 and/or the set 93. The menu item 95 can provide a drop down menu of a number of nearby airports in some embodiments. In some embodiments, the list of airports includes the departure airport, destination airport, and the alternate airport in the listed order.

The radio tuning panel 22 provides a frequency for tower operations on a virtual button 94*a*, a frequency for ground operations on a virtual button 94*b*, a frequency for unicom operations on a virtual button 94*c*, a frequency for approach and departure operations on a virtual button 94*d*, a frequency for ATIS operation on a virtual button 94*e*, and a frequency for clearance operations on a virtual button 94*f*. Each of the virtual buttons 99*a-f* can also provide a label for the associated frequency (e.g., Ground, Tower, Clearance, ATIS). The frequency associated with the virtual button 94*a* provides common traffic advisory information. The frequency associated with the virtual button 94*e* provides ATIS information, such as, weather information, runway use and other pertinent information. The frequency associated with the virtual button 104*a* is for approach and departure information and is filled automatically based upon the flight plan. The flight plan can include the direction of departure or arrival. The frequency associated with the virtual button 94*f* is for discussion and clearance information.

The pilot can select any of the airport frequencies provided by the radio application 42 simply by selecting virtual buttons 94*a-f* or otherwise selecting via the user interface 24. In some embodiments, the pilot selects a communication unit (com unit) associated with com unit virtual buttons 96*a* or 96*b* and then selects a virtual button 94*a-f* to tuned to the selected com unit to the selected frequency. The virtual buttons 96*a* and 96*b* can be shown with an outline to or color highlight to indicate that a selection is taking place in some embodiments.

The radio tuning panel 22 provides an enroute a frequency for a regional control center a (e.g., Chicago ARTCC) on a virtual button 104*a*, and an enroute frequency for Class C operations on a virtual button 104*b*. Each of the virtual buttons 104-*b* can also provide a label for the associated frequency. Additional enroute frequencies can be provided.

The radio tuning panel 22 also provides virtual sections for controlling radio units, such as the com units. A COM1 radio is controlled via a mic button 110*a* and monitor button 110*b*. The current frequency for the COM1 radio is show at an area 112*a* and the previous frequency is shown at an area 112*b*. The pilot can select the previous frequency by selecting the area 112*b*. A COM2 radio is controlled by a mic button 114*a* and a monitor button 114*b*. A current frequency for the COM2 radio unit is shown at area 116*a* and a previous frequency is shown at an area 116*b*. A navigation (NAV) 1 radio is controlled by a monitor button 120. The current NAV1 frequency is shown at area 122*a* and a label for the transponder code is shown at an area 122*b*. A NAV2 radio is controlled using a monitor button 126 and the current frequency for the NAV2 unit is shown at an area 128*a*. A label for the transponder code is shown at an area 128*b*. Deeper level radio control is controlled by a deep control button 130 and applies to NOV, COMS, and Transponder/TCAS system. A current frequency is shown at an area 132*a* and a label is shown at an area 132*b*. A keypad 138 is provided for manually entering radio frequencies, and a push to recognize switch 142 can be provided so that the pilot can use a speaker recognition system.

In some embodiments, as ATC informs a pilot to change to a new frequency, the new frequency is already shown on the radio tuning panel 22 as determined from the terminal frequency module 84 or the enroute frequency module 86 (FIG. 4). For example, tower information for Chicago is provided at frequency 118.7. To tune the COM1 radio unit to the frequency 118.7, the virtual button 94*a* is pressed after the virtual button 96*a* is pressed. While on route, the frequency for Chicago air traffic control center (ARTCC) is set by pressing or touching the virtual button 104*a*. The Chicago ARTCC frequency is provided in response to Chicago being the destination airport or when the aircraft 30 is in Chicago airspace. For example, Chicago airspace may have a large number of frequencies 4, 6, 8, or 12, and the appropriate frequency is selected based upon sector boundaries and the location of the aircraft 30. The enroute frequency module 86 selects the appropriate frequency based upon sector boundaries and sector location in some embodiments. For example, when the aircraft 30 approaches a mile or two within the airspace of an airport, such as a destination airport, the approach or departure controller can be contacted using the frequency provided on the virtual button 104*b*.

More or less buttons may be provided in sets 92 and 93 based upon capabilities of the airport. For example, an airport may have several ground frequencies. These ground frequencies can change as the aircraft 30 travels across the taxi way. These ground frequencies can be automatically listed according to the location of the aircraft 30. In some embodiments, the enroute frequency module 86 determines which runway is going to be used and from the flight plan and which direction the runway approach occurs and determines the predicted frequency based upon that information.

The disclosure is described above with reference to drawings. These drawings illustrate certain details of specific embodiments that implement the systems and methods and programs of the present disclosure. However, describing the disclosure with drawings should not be construed as imposing on the disclosure any limitations that may be present in the drawings. The present disclosure contemplates methods, systems and program products on any machine-readable media for accomplishing its operations. The embodiments of the present disclosure may be implemented using an existing computer processor, or by a special purpose computer processor incorporated for this or another purpose or by a hardwired system. No claim element herein is to be construed under the provisions of 35 U.S.C. § 112, sixth paragraph, unless the element is expressly recited using the phrase "means for." Further, no element, component or method step in the present disclosure is intended to be dedicated to the public, regardless of whether the element, component or method step is explicitly recited in the claims.

As noted above, embodiments within the scope of the present disclosure include program products comprising machine-readable storage media for carrying or having machine-executable instructions or data structures stored thereon. Such machine-readable storage media can be any available media that can be accessed by a general purpose or special purpose computer or other machine with a processor. By way of example, such machine-readable storage media can include RAM, ROM, EPROM, EEPROM, CD ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable storage media. Machine-executable instructions include, for example, instructions and data which cause a general purpose computer, special purpose computer, or special purpose processing machine to perform a certain function or group of functions. Machine or computer-readable storage media, as referenced herein, do not include transitory media (i.e., signals in space).

Embodiments of the disclosure are described in the general context of method steps which may be implemented in one embodiment by a program product including machine-executable instructions, such as program code, for example, in the form of program modules executed by machines in networked environments. Generally, program modules include routines, programs, objects, components, data structures, etc., that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present disclosure may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, servers, minicomputers, mainframe computers, and the like. Embodiments of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the disclosure might include a computing device in the form of a computer, including a processing unit, a system memory, and a system bus that couples various system components including the system memory to the processing unit. The system memory may include read only memory (ROM) and random access memory (RAM) or other non-transitory storage medium. The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules, and other data for the computer.

It should be noted that although specific exemplary orders of method steps are discussed, it is understood that the order of these steps may differ from what is depicted. Also two or more steps may be performed concurrently or with partial concurrence. Such variation will depend on the software and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the disclosure have been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated.

What is claimed is:

1. A predictive radio tuning system for an aircraft, the predictive radio tuning system comprising:
   a processor configured to:
      receive flight information from avionics of the aircraft and radio frequency information from an internet-based system wide information management system (SWIM); and
      provide a list of predicted frequencies in response to the flight information and the radio frequency information when the aircraft is under prior conditions using previous selections of frequencies received via a virtual radio tuning panel under the prior conditions, wherein the list of predicted frequencies is displayed on the virtual radio tuning panel for selection by a user.

2. The predictive radio tuning system of claim 1, wherein the processor is part of a ground-based server.

3. The predictive radio tuning system of claim 2 wherein the list of predicted frequencies is transmitted to the aircraft and an aircraft based processor is configured to cause the list of predicted frequencies to be displayed on the virtual radio tuning panel of a head down display in a cockpit.

4. The predictive radio tuning system of claim 1, wherein the processor is disposed in the aircraft.

5. The predictive radio tuning system of claim 1, wherein the flight information comprises at least one of a, geographic location, flight plan, phase of flight, departure direction, area of airport, a boundary crossings, and an arrival direction.

6. The predictive radio tuning system of claim 1, wherein the processor is configured provide the list of predicted frequencies in response to a time of day.

7. The predictive radio tuning system of claim 1, wherein the processor is configured provide the list of predicted frequencies in response to sector congestion or active sectors.

* * * * *